UNITED STATES PATENT OFFICE.

GEORG SCHNEIDER, OF FRIEDEBURG, GERMANY, ASSIGNOR TO EUGEN ABRESCH, OF NEUSTADT-ON-THE-HARDT, GERMANY.

PROCESS OF PRODUCING VERDIGRIS.

1,009,864.     Specification of Letters Patent.    Patented Nov. 28, 1911.

No Drawing.    Application filed June 29, 1908. Serial No. 440,991.

*To all whom it may concern:*

Be it known that I, GEORG SCHNEIDER, royal counselor of mines, and resident of Friedeburg, Schlossstrasse No. 86, Freiberg, in the Kingdom of Saxony, Germany, have invented a new and useful Process of Producing Verdigris, of which the following is a specification.

Certain copper ores which are according to present practice treated only with mineral acids may be caused to furnish more valuable products than have hitherto been obtained if acetic acid be employed for their extraction. In this case verdigris in crystalline form is obtained.

According to the present invention the process is carried out by treating ores containing copper carbonate with suitably diluted acetic acid, for instance with a 15% acid. From the impure solution thus obtained, first the free acetic acid is removed by saturation or distillation, and then the impurities such as iron, alumina, lime, etc., are precipitated by means of sodium, calcium or ammonium carbonate or the hydrated oxids of these metals. From the purified solution the verdigris can be obtained by crystallization.

The reactions involved in treating malachite and azurite with acetic acid, are as follows:

(1) 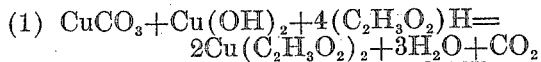
$$CuCO_3 + Cu(OH)_2 + 4(C_2H_3O_2)H = 2Cu(C_2H_3O_2)_2 + 3H_2O + CO_2$$

(2) 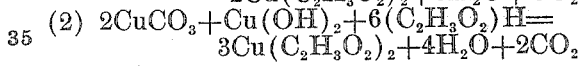
$$2CuCO_3 + Cu(OH)_2 + 6(C_2H_3O_2)H = 3Cu(C_2H_3O_2)_2 + 4H_2O + 2CO_2$$

and from the resultant solutions the copper acetate may be recovered in crystalline form, which characterizes the neutral acetate or verdigris.

In carrying out the process with an ore containing approximately 1% of copper, for example azurite or malachite, which also contain small quantities of iron oxid, aluminum oxid, calcium and magnesium, the following procedure, for the production of crystalline verdigris has been found effective. The crude ore is first comminuted or granulated so as to pass through a screen having ½ millimeter mesh. The granulated ore is then placed in wooden soaking vats, preferably provided with false bottoms and is covered to a depth of approximately 10 cm. with a 15% solution of acetic acid, which may be produced by diluting the ordinary 30% commercial acid with an equal part of water. The carbon dioxid which is freed by the reaction between the acid and the ore is sufficient to penetrate some 40 to 50 cm. of the comminuted ore, and the passage of the gas through the ore permits the acid to pass through the body of ore and take up the copper therein in about 18 hours, without the application of artificial heat to raise the temperature. If, however, a moderate heat is employed, 8 hours or less is found sufficient to convert all of the copper into acetate. After this operation, the liquor is run off and the residuum, which contains much free acetic acid, is washed once or twice with water for the purpose of recovering the acid. It will be found that the remaining portion of the ore generally contains less than .12 to .15% of copper. If the pulverized ore contains much slimes, it may be desirable to assist the passage of the fluid through the body of the ore by exhausting the air from the lower portion of the vat, and this may be effected in any well known manner. As the ore becomes poorer in carbonate of copper, fresh portions of the comminuted ore may be added from time to time, and in case malachite or azurite is employed, it has been found that three separate batches of crude ore may be subjected to a single portion of the acid, the copper content of the solution increasing and the amount of the free acetic acid correspondingly decreasing.

In addition to the copper taken up by the acid, it will be found that iron aluminum, calcium and magnesium, contained in the ore are converted into acetate and dissolved in the solution, but inasmuch as the addition of fresh portions of the ore enables the copper to replace the elements just mentioned in the formation of copper acetate, the formation of these undesirable by-products in the mother liquor does not proceed as rapidly as the production of the described copper acetate. For example it has been found that by subjecting three separate portions of comminuted ore to the action of a single portion of the acid bath, the copper content of the first resulting solution was about 7.20 grams of copper per liter (corresponding to 22.5 grams of verdigris as a final product) with a content of iron oxid and clay amounting to 1.45 grams; that the second solution contained 11.28 grams of copper per liter (corresponding to 35.25 grams of verdigris) with the accompanying recovery of 4.00 grams of iron oxid and clay; and that in the third phase of the operation the solution contained 15.25 grams of copper (corresponding to 47.65 grams of verdigris) as compared with 3.97 grams of the impurities above noted. Hence it will be observed that while the copper content constantly increases, the content of impurities does not rise above a certain limit (in this case 4.00 grams). This result follows from the fact that the iron or other undesirable acetate formed by the carbonate of the ore and the acetic acid, is converted into a carbonate and copper acetate. In this manner the chief impurity, *i. e.* iron acetate, is kept down below a certain minimum notwithstanding the increased yield of copper acetate as the operation progresses; and the same is true of the other acetates which form objectionable impurities.

After the solution has taken up a definite quantity of copper acetate or verdigris, for instance, as in the case above indicated, approximately 50 grams per liter, the solution is preferably placed in an ordinary distilling apparatus to distil off the free acetic acid, which is collected and after being diluted to the proper proportions, is employed for treating further batches of ore. The solution, after it has been deprived of the free acid is then treated with an appropriate quantity of soda in order to precipitate all impurities in the form of iron, aluminum, calcium, and magnesium salts, without however affecting the copper salts. The copper salts are not thrown down by the soda because the copper precipitate is not formed as quickly as those of the elements above mentioned, but on the other hand sometime after the precipitation of the salts of these elements, so that by the addition of predetermined measured quantities of soda to the solution, which will be sufficient to throw down the impurities without a further reaction, the purifying of the solution by the elimination of the aforesaid impurities can be readily effected. The precipitates formed in this way, carry down with them any fine slimes in the solution, and, after settling, the latter is filtered in order that nothing but copper acetate and sodium acetate will be present in the clear final solution. The latter is then concentrated and cooled in any suitable way, whereupon the pure verdigris is crystallized out, without any accompanying crystallization of the sodium acetate, which is much more easily soluble.

Now what I claim and desire to secure by Letters Patent is the following:

1. The process of treating copper carbonate ores for the production of verdigris, which consists in treating the ores with diluted acetic acid, removing from the impure solution thus obtained the free acetic acid, precipitating the impurities such as iron, alumina, lime and the like, and recovering the verdigris from the purified solution by crystallization; substantially as described.

2. The process of treating copper carbonate ores for the production of verdigris, which consists in treating the ores with an acetic acid solution containing approximately 15% of acetic acid, removing by distillation the free acetic acid in the impure solution thus obtained, precipitating the impurities such as iron, alumina, lime and the like by adding a suitable carbonate, and recovering the verdigris from the purified solution by crystallization; substantially as described.

In testimony, that I claim the foregoing as my invention, I have signed my name in presence of two witnesses, this seventeenth day of June, 1908.

GEORG SCHNEIDER.

Witnesses:
FRIEDRICH KOLBECK,
MARTIN HENGLEIN.